United States Patent
Pelders et al.

(10) Patent No.: US 6,612,949 B2
(45) Date of Patent: Sep. 2, 2003

(54) CONTINUOUSLY VARIABLE TRANSMISSION AND CONTROL METHOD THEREFOR

(75) Inventors: Hendrikus Adrianus Arnoldus Wilhelmina Pelders, Nuland (NL); Pieter Abraham Veenhuizen, Goirle (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/892,526

(22) Filed: Jun. 28, 2001

(65) Prior Publication Data

US 2002/0002100 A1 Jan. 3, 2002

(30) Foreign Application Priority Data

Jun. 30, 2000 (EP) .............................................. 00202292

(51) Int. Cl.$^7$ ........................... F16H 59/04; B60K 41/12
(52) U.S. Cl. .............................. 474/69; 474/70; 477/46; 477/44
(58) Field of Search .......................... 474/28, 70, 18, 474/69, 17; 477/45, 48, 44, 46

(56) References Cited

U.S. PATENT DOCUMENTS 5,182,968 A * 2/1993 Mott ........................... 474/28
5,259,272 A * 11/1993 Yamamoto et al. ........... 477/45
5,427,579 A * 6/1995 Kanehara et al. .............. 474/28
5,853,347 A * 12/1998 Aoki et al. ..................... 477/45

FOREIGN PATENT DOCUMENTS

| DE | 39 38 539 | 6/1991 | | |
| EP | 0 759 518 | 2/1997 | | |
| JP | 04-347048 A | * 12/1992 | ................ | 477/45 |
| JP | 10 103437 | 4/1998 | | |
| JP | 10 252881 | 9/1998 | | |
| WO | WO 98/02679 | 1/1998 | | |
| WO | WO 01/20198 A1 | * 3/2001 | ................ | 477/45 |

* cited by examiner

*Primary Examiner*—Marcus Charles
(74) *Attorney, Agent, or Firm*—Young & Thompson

(57) ABSTRACT

A continuous variable transmission includes a pair of pulleys forming V-shaped grooves for receiving an endless transmission element for transmitting torque between the pulleys. Each pulley includes at least one axially movable sheave which may be urged axially in the direction of the transmission element by an urging element effecting a clamping force between the sheave and the transmission element, the effected clamping force corresponding to a force sufficient for transmitting a torque to be transmitted by at least virtually slipless friction between the pulley sheaves and the belt, increased by a safety margin expressed as a factor corresponding to a percentage of the torque to be transmitted throughout a major part of the range of torques transmittable to the relevant transmission.

8 Claims, 2 Drawing Sheets

CONTINUOUSLY VARIABLE TRANSMISSION AND CONTROL METHOD THEREFOR

BACKGROUND OF THE INVENTION

The present invention relates to a transmission and control system.

DESCRIPTION OF THE RELATED ART

Such a transmission and control system are known from the non prepublished international application number PCT/EP 99/07000, and in general from EP-A-0.451.887. Continuously variable transmissions of these kind for transmission of force fully rely on friction between transmission components and represent a relatively new transmission technology when compared with conventional kinematic transmissions utilising mechanically interacting gearwheels, the development of which for automotive applications started about one century earlier. For safely, i.e. non destructively and lasting operation of such continuous variable transmissions it is a pre-requisite to generally slipless perform the transmission of power, particularly where the frictionally engaging transmission elements, as in the current case, are produced in metal, i.e. of comparable surface hardness so that mutual scratching at contacting surfaces can occur. Amongst others because the contacting surfaces are hardened only to a limited depth of a supervised layer, it is highly important to prevent damage at the contacting surfaces of pulley and belt.

In the early days of the known transmission the clamping force in a pulley required for realising for the transmission of an actual torque to be transmitted was in creased by an additional amount of safety force. This amount of safety was added to all values of pinching force required to transmit any desired torque to be transmitted, within the range of possible torques transmittable by the relevant transmission.

The above mentioned amount of safety added to the required amount of pinching force, could at the largest torque transmittable by the relevant transmission be expressed as a safety factor as was demonstrated by a new transmission design of applicant described in the application "High torque CVT P930, design and test results" at the occasion of the 1997 Imech-E congress in London. It was demonstrated that this safety factor could be used for a so called optimised safety throughout virtually the entire range of torques to be transmitted by a relevant transmission without damage occurring to the transmission. The actual nominal safety factor found practicable for optimising the pinching force applied appeared to be 1.3, which contributed to a significant increase in transmission efficiency as compared to the earlier commonly applied amounts of safety force which compared to a safety factor of between 2 and 2.5 when calculated at the maximum transmittable torque by a relevant transmission. It was indicated to be necessary to control the clamping force as close the safety factor limit as possible.

SUMMARY OF THE INVENTION

It is an object of the current invention to yet further optimise the continuous variable transmission per se as indicated by the latter disclosure, thereby maintaining a lowest possible risk of sudden loss of transmission efficiency through the virtually immediate drop of transmission efficiency from optimum to zero at any occurrence of slip due to insufficient clamping force. Simultaneously it is also an object to favourably optimise efficient use of the same transmission.

With a transmission provided with the control measures according to the invention a significant reduction of power (fuel) consumption can be realised at use of the transmission e.g. in a vehicle, based on the insight that in use of such transmission, transmission ratios near overdrive ratio (OD) dominate, i.e. occur for most of the time of use. Thus a relatively insignificant further reduction of the safety factor realises a significant reduction of costs at use of such transmission. This is realised by favourably taking advantage of the circumstance that at higher levels of torque be transmitted, the absolute amount of clamping force has been brought to a significant high level, such that according to the invention any changes in torque to be transmitted at such levels of actual torque, either initiated through the engine or through road circumstances, become relatively small at increasing actual torque levels. In this manner it is provided that e.g. at the highest torque transmittable by the relevant transmission, the safety factor may be further reduced to close to 1. The invention is also based upon the underlying insight and finding that, whereas in so called LOW transmission mode the slip rate of a transmission gradually increases with increasing torques to be transmitted and shows a jump in slip rate within the torque range transmittable, whereas the slip rate at overdrive reliably remains at a relatively low level before or it suddenly increases into infinite maximum torque transmittable by the relevant transmission.

BRIEF DESCRIPTION OF THE DRAWINGS

Favourable embodiments of the transmission and control thereof are provided below.

For illustrating the present invention FIGS. 1 and 2 are added by way of example in which:

FIG. 1 shows a typical relation between the torque T transmittable by a particular transmission and the actual pressure P applied for realising a required amount of pinching force with a hydraulically embodied control system; and FIG. 2 shows a typical relation between transmittable torque T and the slip rate S expressed in percentages at the respective transmission modes of ratio LOW and overdrive ratio OD.

DESCRIPTION OF THE PREFERRED EMBODIMENTS

Figure 1:
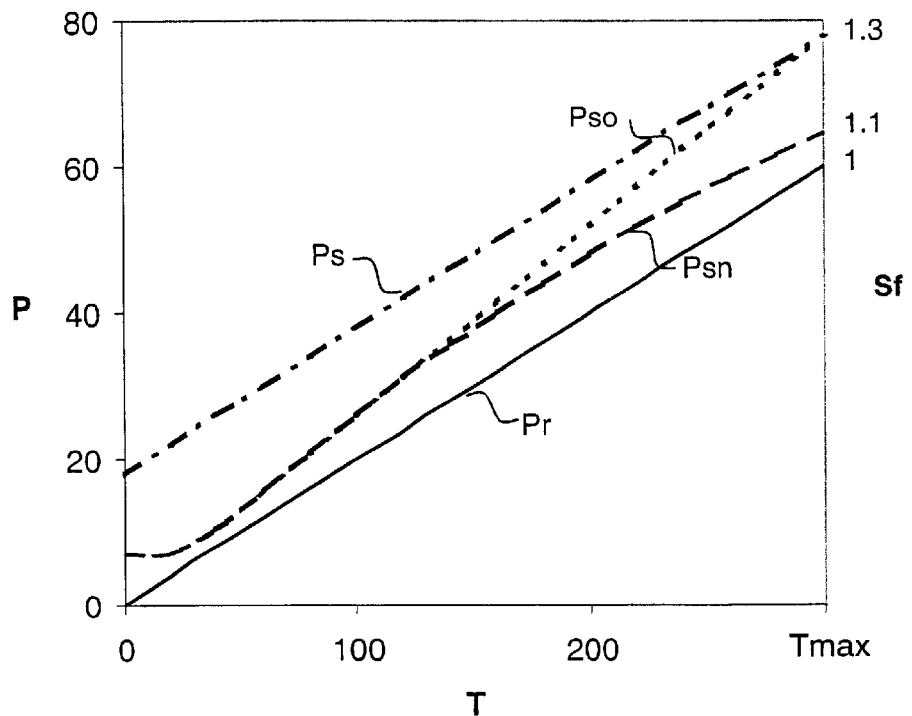
Figure 2:
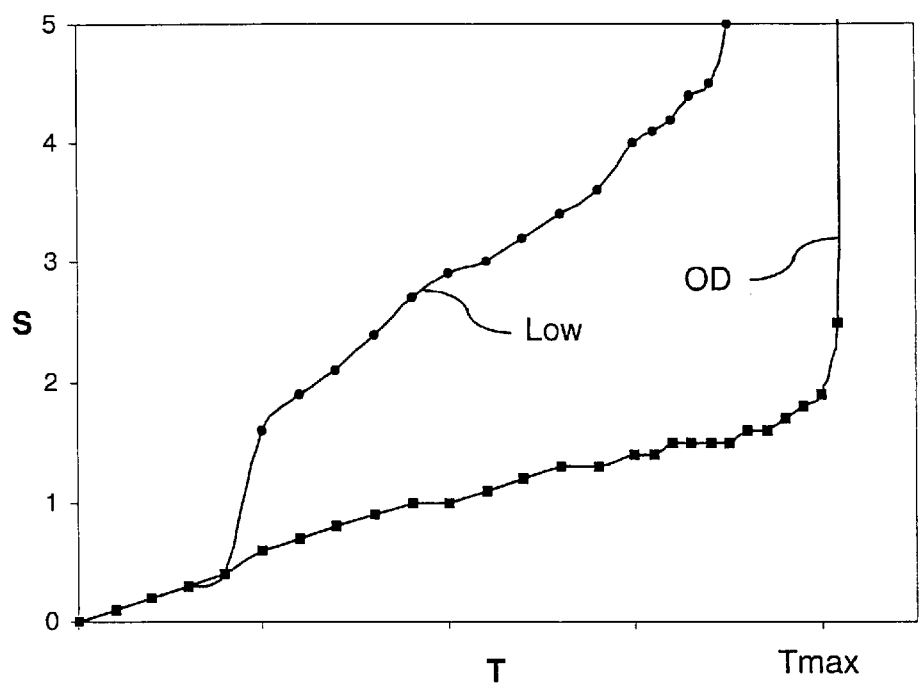
Figure 3:
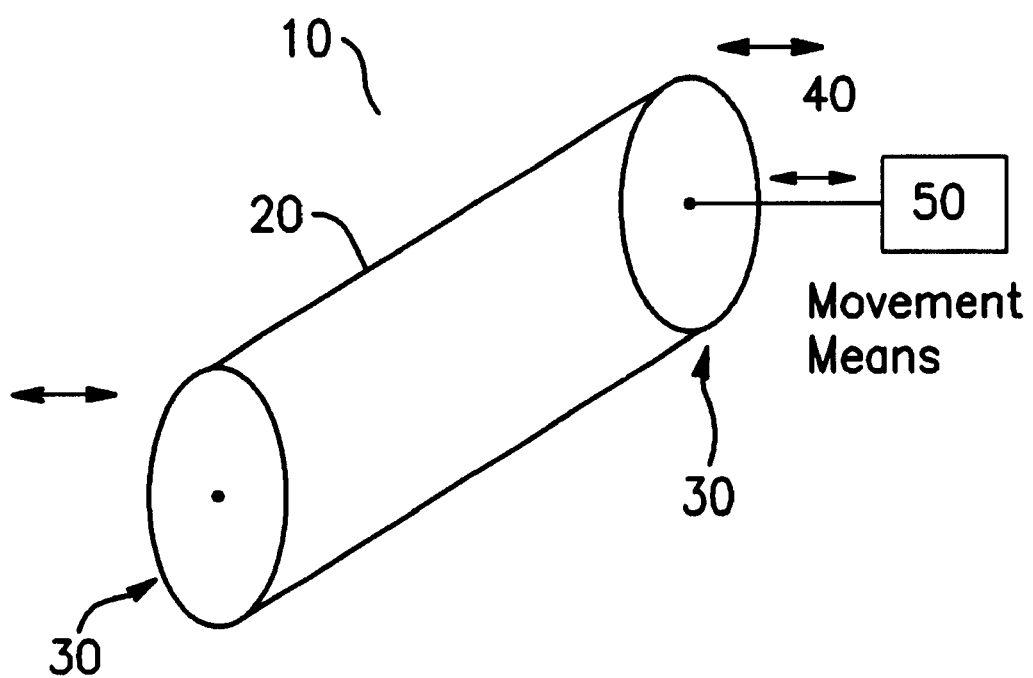
FIG. 3 is a simplified CVT illustration.

The relations shown in this example are derived from a continuous variable transmission utilising a metal push belt and as adapted for automotive application, but the principle defined according to the invention may generally be applied for other transmissions taking into account the particularities thereof, in accordance with the common skills of the practitioners in the present art. The transmission itself and a manner control of such transmissions are presumed generally know in the art and are otherwise explained further in the documents referred to in the introductory part of the description. The modes of a transmission are defined at least by the actual transmission ratio and the actual torque transmitted.

In the annexed figures the denotations refer as follows:
Sf: safety factor;
T: the actual torque to be transmitted by a particular transmission;

Tmax: the maximum transmittable torque transmittable by a particular transmission;

S: the slip rate of a transmission, here expressed as a percentage;

P: the actual hydraulic pressure P applied for realising any amount of pinching force in case of a hydraulically embodied control system and in fact representing the pinching or alternatively denoted clamping force as mentioned in the introductory part;

Pr: the pressure required for transmitting a particular torque;

Ps: Pr increased with an amount of safety pressure representative of an amount of safety force discussed in the introductory part;

Pso: Ps optimised according to the explanation in the introductory part by realising the amount of safety as a factor of the amount of required pressure Pr;

Psn: a new realisation and further optimisation of Pso as explained in the introductory part.

A continuous variable transmission 10 includes an endless transmission element 10 (e.g. a belt) for transmitting torque between two pulleys 30. The pulleys each comprise at least one axially movable sheave 40 which may be urged axially in the direction of the transmission element, by a movement means 50 as known in the art, to effect a clamping force.

Depending on the particular application the dependency of the safety factor realising Psn, of actual torque T may be throughout the entire range of torques to be transmitted. In a preferred embodiment the dependency starts at a pre-set threshold value of T, more preferably from a value near half way Tmax. For instance the safety factor may between T=150 and Tmax=300 be reduced linearly from a nominal safety factor Sf=1.3 to a pre-set lowest safety factor Sf=1.1 as represented in FIG. 1. For reason of utmost safety this reduction could only be applied in transmission mode OD. It can however also be applied at ratios near OD. Preferably such reduction of Sf is started from transmission mode with ratio 1, however tempered by a factor preferably linearly decreasing from 1 at ratio 1 to 0 (zero) at OD mode, such that nominal safety factor (1.3) is still applied at ratio 1 and T not having exceeded the preset threshold torque value (150), while the lowest safety factor (1.1) is reached at OD and max transmittable torque Tmax. The pre-set lowest value may be chosen at any value close to 1, whereas the present invention also allows increase of the nominal safety value when desired for a particular application, without undue effect upon the efficiency of use of the transmission.

What is claimed is:

1. Continuous variable transmission comprising:

a pair of pulleys forming V-shaped grooves for receiving an endless transmission element, the endless transmission element for transmitting torque between the pulleys, each pulley comprising at least one axially movable sheave which may be urged axially in the direction of the transmission element by an urging means effecting a clamping force between said sheave and said transmission element, the effected clamping force corresponding to a force sufficient for transmitting a torque to be transmitted by at least virtually slipless friction between the pulley sheaves and the belt, increased by a safety margin expressable as a safety factor, Sf of the clamping force required for transmitting an actual torque to be transmitted, and applied throughout at least a major part of a range of torques transmittable by the transmission, wherein the safety factor Sf is set as a function of the torque to be transmitted, and of an actual transmission ratio, such that the actual safety factor at predefined transmission modes is reduced from a nominal safety factor (Sfo) of at least 1.3 to a value above 1 and lower than the nominal safety factor (Sfo), the predefined modes being related to relatively high torques within the range of transmittable torques, and to relatively high values of actual transmission ratios within a range of transmission ratios of the transmission.

2. Continuous variable transmission according to claim 1, characterised in that the safety factor is gradually lowered from a pre-set nominal value to a pre-set lowest value as from a pre-set torque threshold value, provided that a pre-set threshold value of the transmission ratio has been exceeded.

3. Continuous variable transmission according to claim 1, characterised in that the lowering of the safety factor is reduced by a factor related to the relative position of the actual transmission ratio, between a threshold value and a maximum transmission ratio value (OD).

4. Continuous variable transmission according to claim 1, characterised in that a pre-set torque threshold value conforms to a torque value intermediate between zero and the maximum torque transmissible by the transmission.

5. Continuous variable transmission according to claim 1, characterised in that a pre-set transmission ratio threshold value conforms to medium transmission ratio value matching 1.

6. Continuous variable transmission according to claim 1, characterised in that a pre-set lowest safety factor value matches 1.1.

7. Continuous variable transmission according to claim 1, characterised in that the nominal safety factor value matches 1.3.

8. Control method for a continuous variable transmission using a pair of pulleys forming V-shaped grooves for receiving an endless transmission element, the endless transmission element for transmitting torque between the pulleys, each pulley comprising at least one axially movable sheave which may be urged axially in the direction of the transmission element by an urging means effecting a clamping force between said sheave and said transmission element, the effected clamping force corresponding to a force sufficient for transmitting a torque to be transmitted by at least virtually slipless friction between the pulley sheaves and the belt, increased by a safety margin expressable as a safety factor Sf of the clamping force required for transmitting an actual torque to be transmitted, and applied throughout at least a major part of a range of torques transmittable by the transmission, wherein the safety factor Sf is set as a function of the torque to be transmitted, and of an actual transmission ratio, such that an actual safety factor at predefined transmission modes is reduced from a nominal safety factor (Sfo) of at least 1.3 to a value above 1 and lower than the nominal safety factor (Sfo), the predefined modes being related to relatively high torques within the range of transmittable torques, and to relatively high values of actual transmission ratios within the range of transmission ratios of the transmission.

* * * * *